United States Patent
Koseoglu et al.

(10) Patent No.: US 10,619,110 B2
(45) Date of Patent: Apr. 14, 2020

(54) HYDROCRACKING AND HYDROTREATING CATALYTIC COMPOSITIONS COMPRISING A ZEOLITE AND REGENERATED, SPENT CATALYST AND USES THEREOF

(71) Applicant: SAUDI ARABIAN OIL COMPANY, Dhahran (SA)

(72) Inventors: Omer Refa Koseoglu, Dhahran (SA); Robert Peter Hodgkins, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 119 days.

(21) Appl. No.: 15/950,566

(22) Filed: Apr. 11, 2018

(65) Prior Publication Data

US 2019/0316044 A1 Oct. 17, 2019

(51) Int. Cl.

| | |
|---|---|
| *B01J 29/06* | (2006.01) |
| *C10G 47/20* | (2006.01) |
| *B01J 29/076* | (2006.01) |
| *B01J 29/16* | (2006.01) |
| *B01J 29/14* | (2006.01) |
| *B01J 37/02* | (2006.01) |
| *B01J 37/00* | (2006.01) |
| *B01J 37/20* | (2006.01) |

(52) U.S. Cl.
CPC ............ *C10G 47/20* (2013.01); *B01J 29/061* (2013.01); *B01J 29/076* (2013.01); *B01J 29/146* (2013.01); *B01J 29/16* (2013.01); *B01J 29/166* (2013.01); *B01J 37/0009* (2013.01); *B01J 37/0201* (2013.01); *B01J 37/20* (2013.01); *B01J 2229/10* (2013.01); *B01J 2229/18* (2013.01); *B01J 2229/186* (2013.01); *B01J 2229/20* (2013.01); *B01J 2229/42* (2013.01)

(58) Field of Classification Search
CPC ...... B01J 29/076; B01J 29/072; B01J 29/061; B01J 29/16; B01J 29/166; B01J 29/146; B01J 2229/10; B01J 2229/18; B01J 2229/186; B01J 2229/20; B01J 2229/42; B01J 35/0006; B01J 37/0009; B01J 37/0201; B01J 37/20; C10G 45/12; C10G 47/20

USPC ...... 502/63, 64, 66, 67, 69, 74, 79; 208/109, 208/110, 111.01, 111.35, 210, 213, 216, 208/217, 254 H, 251 H, 251 R, 253
See application file for complete search history.

(56) References Cited

U.S. PATENT DOCUMENTS

| | | | |
|---|---|---|---|
| 3,538,017 A | 11/1970 | Aglietti et al. | |
| 3,932,269 A | 1/1976 | Lehman | |
| 4,410,443 A | 10/1983 | Pessimisis | |
| 5,061,362 A | 10/1991 | Yamamoto et al. | |
| 6,030,915 A | 2/2000 | De Boer | |
| 2009/0258779 A1 | 10/2009 | McCarthy et al. | |
| 2010/0326890 A1 | 12/2010 | Bhan | |
| 2012/0157293 A1* | 6/2012 | Thota | B01D 53/864 502/65 |

FOREIGN PATENT DOCUMENTS

| | | | |
|---|---|---|---|
| CA | 2487726 A1 | | 5/2003 |
| EP | 568407 B1 | | 11/1991 |
| EP | 0499248 | * | 8/1992 |
| RO | 109713 B1 | | 9/1993 |
| SU | 882981 B | | 11/1981 |
| SU | 1728157 A1 | | 4/1991 |

OTHER PUBLICATIONS

Florian et al., Machine translation of RO 109713, Sep. 30, 1993.*
International Search Report and Written Opinion from PCT/US2019/016848 dated Apr. 16, 2019.
Carla Costa, et al., "Alkali-Activated Binders Produced from Petrochemical Fluid Catalytic Cracking Catalyst Waste," IJRET: International Journal of Research in Engineering and Technology, eISSN: 2319-1163/pISSN:2321-7308 (Aug. 2014).
V. Antonovic, et al., "Investigating the hydration of deflocculated calcium aluminate cement-based binder with catalyst waste," Journal of Thermal Analysis and Calorimetry, 109:2:537-544 (Aug. 2012).

* cited by examiner

*Primary Examiner* — Elizabeth D Wood
(74) *Attorney, Agent, or Firm* — Abelman, Frayne & Schwab

(57) ABSTRACT

The invention relates to a composition useful as a hydrotreating or hydrocracking catalyst, where fresh catalyst useful in hydrotreating or hydrocracking is combined with spent catalyst, and optionally with additional active metal. The resulting compositions can be used in hydrotreating or hydrocracking but not FCC processes.

15 Claims, 3 Drawing Sheets

FIG. 1A1
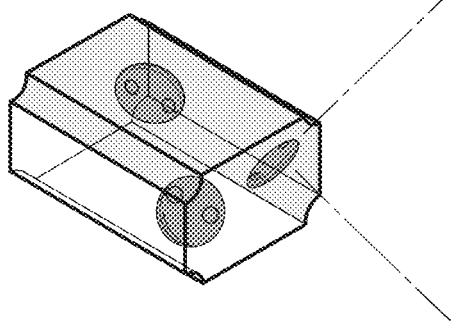
FIG. 1A2
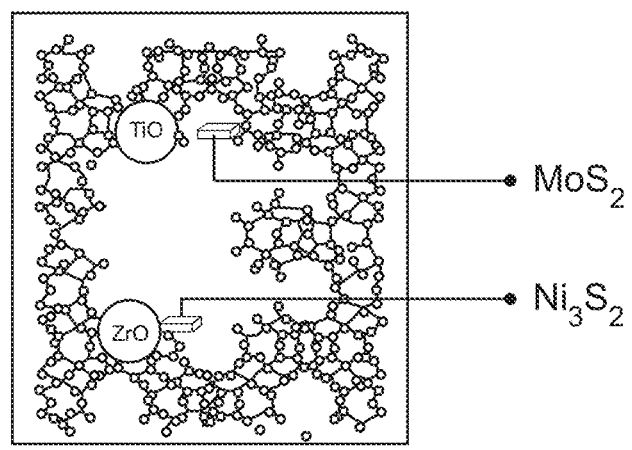

HYDROCRACKING AND HYDROTREATING CATALYTIC COMPOSITIONS COMPRISING A ZEOLITE AND REGENERATED, SPENT CATALYST AND USES THEREOF

FIELD OF THE INVENTION

The invention relates to the use of regenerated spent catalysts as binders, to regenerate catalysts with higher activity, as well as compositions that are fundamentally different as compared to the catalyst prior to regeneration.

BACKGROUND AND PRIOR ART

Catalyst deactivation is a common, well known problem in industries, such as the petrochemical industry. It is a complex phenomenon, involving the coating of catalysts with a deposit, leading to partial or complete deactivation. The most widely known form of this phenomenon is deactivation via coke formation.

To say coke formation is a complex process is an understatement. Different variables, including the catalyst itself, the feedstock, and the process in which the catalyst is involved, are all material to its formation. To generalize, coke formation results from carbonaceous residues covering active sites of a heterogeneous catalyst surface, leading to reduction of catalytic activity.

This reduction in catalyst activity is a problem of great and growing concern in industrial catalytic processes and leads to increased costs per annum in the billions, due to the need to replace catalysts, and process shutdowns resulting from this need.

The standard way to reactivate a deactivated catalyst is to burn deposited coke off of a catalyst surface. The resulting, reactivated catalyst never has activity equal to its activity at the start. Indeed, there is a loss of activity after every regeneration cycle, until it is not practical to regenerate the spent catalyst.

Different processes use different catalysts. Hydrocracking catalysts, in general, comprise a zeolite, a binder material, and one or more active metals. Such catalysts are the focus of this invention. All of these catalysts comprise a zeolite, a binder, and one or more catalytically active metals.

The invention described herein is directed to using regenerated spent catalyst as the binder, combined with a fresh or fresher hydrocracking or hydrotreating catalyst, so as to minimize economic loss. In brief, spent catalyst is prepared so that it can be used as a binder, and then combined with fresh or fresher hydrotreating and/or hydrocracking catalyst, optionally with additional catalytically active metal. While not wishing to be bound to any particular theory or mechanism, it is believed that hydroxyl groups on regenerated, spent catalyst condense to form covalent bonds between heteroatoms, connected via an oxygen bridge.

The prior art shows the long standing interest in this area of technology. RO 109713, which is considered the most relevant prior art, teaches washing spent catalyst with $HNO_3$, to generate hydroxyl groups. The resulting, washed spent catalyst is then used with a new catalyst. $HNO_3$ is known to attack alumina, but not silica. Ni and Cr are the only active metals described, and Cr is not a metal which is known in hydrocracking catalysts.

U.S. Pat. No. 5,061,362, to Yamamoto, et al., combine two, independent catalysts in oil (a direct desulfurization catalyst, and a Mo free, spent FCC catalyst).

U.S. Pat. No. 4,410,443 discusses technology which is also seen in, e.g., U.S. Pat. No. 3,538,017 and EP 568407, all of which deal with recovery of active metal from spent catalysts, and reusing the metal.

U.S. Pat. No. 3,932,269 to Lehman, et al., teaches the in situ regeneration of spent catalyst for use in an ebullated bed. The spent catalyst is "per se" regenerated, rather than being used as a binder.

SU 882918 is to the same end, with a fluidized catalyst useful in FCC processes, but not non-FCC processes.

SU 1728157 teaches the binding of waste catalyst with $Al(OH)_3$, rather than using the spent catalyst as a binder.

CA 2487726 also deals with an FCC process where fluidized particles are produced. Kaolin is used as an additive.

Costa, et al., IJRET:114-122 (September 2014), teaches adding spent, FCC catalysts to sand, to produce mortar. This teaching is similar to that of Antonovic, et al., J. Therm. Analysis & Coloremetry, 109(2):537-544 (February 2012).

Fundamentally, the art deals with FCC processes which differ considerably from hydrocracking, as described infra. The later are the subject of the invention, which will be seen from the disclosure which follows.

BRIEF DESCRIPTION OF THE FIGURES

FIG. 1A1 depicts a standard catalytic extrudate of zeolite, binder, and active metal. FIG. 1A2 shows the structure of a catalyst base material, post modified, Ti and Zr inserted, USY zeolite, and active phase metals.

FIG. 2 represents the "lifetime" of a typical catalyst.

DETAILED DESCRIPTION OF PREFERRED EMBODIMENTS

Figure 2:
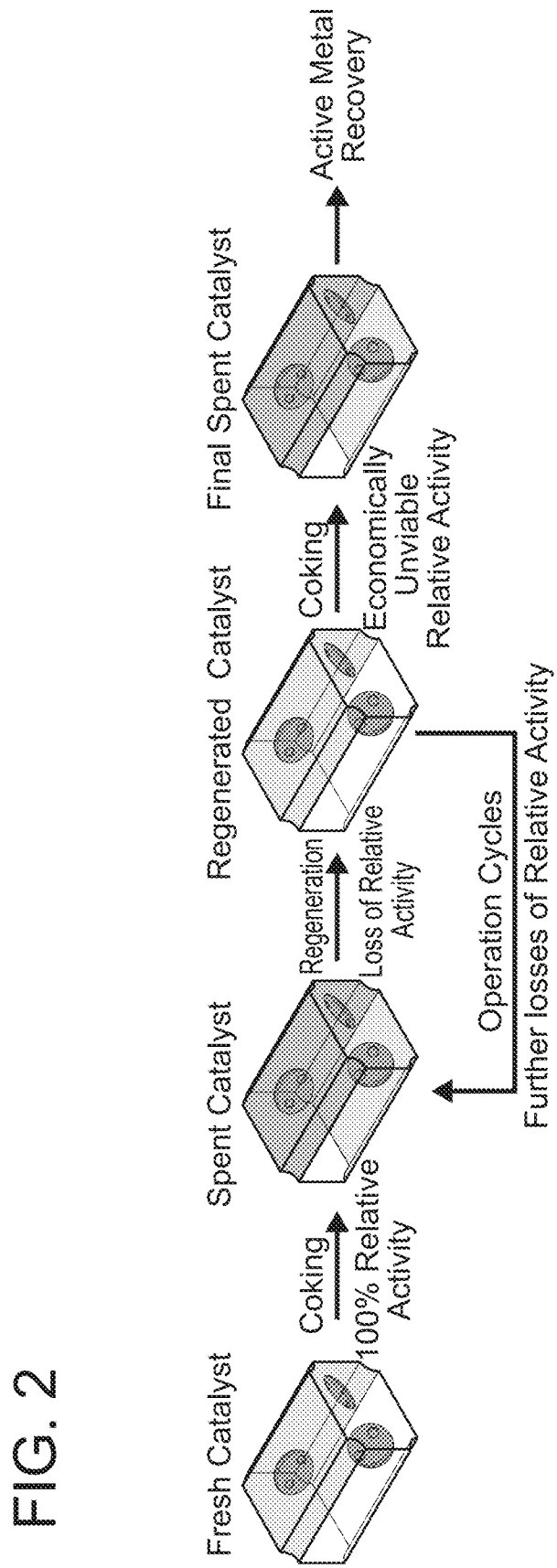

With reference to the figures, FIG. 1A2 shows more details of FIG. 1A1, for a theoretical USY hierarchical/mesoporous zeolite having the framework T-atoms part substituted with Ti and Zr, which has been mixed with a binder, and extruded, with active phase metals Ni and/or Co and/or Mo and/or W. These metals can be added before, or after extrusion.

As discussed supra FIG. 2 shows what occurs during the use of a catalyst. The activity of a fresh catalyst is set at 100%. As it is used, the catalytic activity drops, until it reaches a point where it must be regenerated. The regenerated catalyst has less activity relative to the fresh catalyst. This cycle repeats, until activity drops to the point where the catalyst is treated to recover the active metals, and the catalyst can no longer be used. To elaborate, in each cycle, the regenerated catalyst from the prior cycle becomes an "almost fresh" catalyst, but the catalytic activity of this "almost fresh" catalyst decreases with each cycle.

Figure 3:
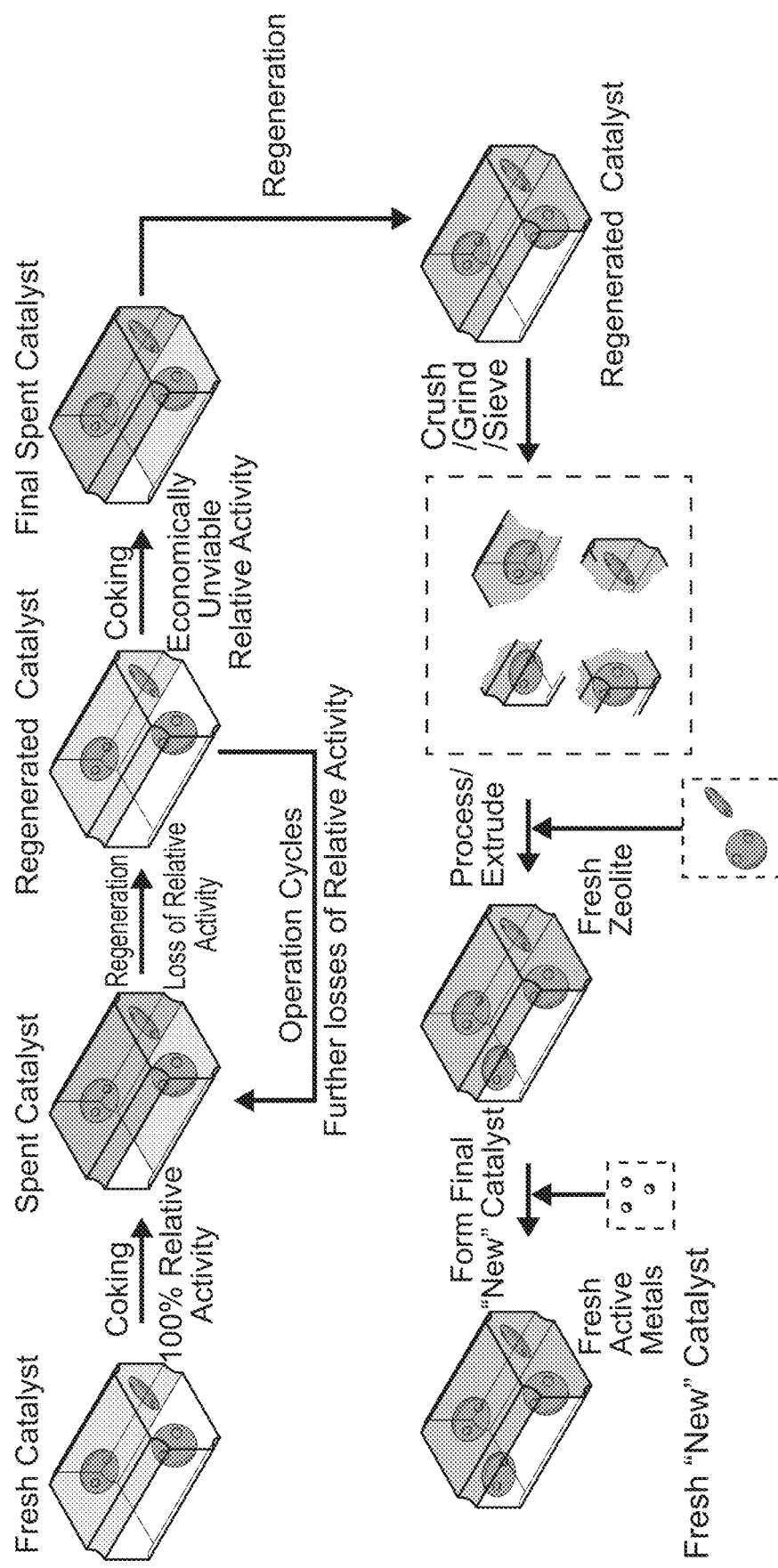
FIG. 3 is a very broad schematic of the disclosed invention.

FIG. 3 depicts the invention, which involves a process that begins after the process of FIG. 2 ends. Instead of recovering active metals, a final regeneration step is carried out. After this step, the catalyst is ground to a powder with a mesh size of 30 or greater (a mesh size of 30 corresponds to 595 μm). In the alternative, the grinding can bring the powder to predetermined specifications. In an alternative mode, the final regeneration step can take place after formation of the powder.

The resulting powder contains a known amount of active metal, since the starting material contained a known amount of this metal.

This powder serves as a binder and is combined with a new catalyst, optionally with additional active metal, to achieve a desired amount of that metal. Additional new or fresh binder may be added if desired. This may be, e.g., one or more of silica, alumina, alumina silica, or clay. To the same end, the mixture can be configured with a zeolite concentration in mind. The resulting composition can be extruded, with the binder consisting of spent catalyst.

It should be noted that any regenerated spent catalyst used for a binder will, by definition, contain contaminants from the process in which it was used. Among these added materials are carbon, sulfur, metals such as vanadium, nickel, molybdenum, iron, arsenic, phosphorus, etc. Contaminants will decrease the catalytic activity and/or selectivity of the catalyst, and will also change physical properties by, e.g., decreasing the surface area and volume of the catalyst.

The resulting catalytic composition for the regenerated catalyst can regain the activity loss of catalyst, which is usually between 3-6° C.

EXAMPLES

Background Example

This "background example" provides data on regenerated catalysts which can be used as binders. In brief, catalysts were used for hydrocracking, and the spent catalysts were then regenerated and analyzed. The results are shown in Table 1. ("LOI" refers to "Loss on Ignition").

TABLE 1

| Description | C, W % | S, W % | LOI@500° C. W % | Ni, W % | As, ppmw | Fe, ppmw | V, ppmw | Na, ppmw | SA, M$_2$/g | P, ppmw |
|---|---|---|---|---|---|---|---|---|---|---|
| Catalyst 1 | <0.10 | <0.1 | 2.35 | 1.00 | <10 | 174 | 781 | 963 | 190 | <100 |
| Catalyst 2 | <0.01 | <0.1 | 3.97 | 1.10 | <10 | 130 | 697 | 1,119 | 209 | <100 |
| Catalyst 3 | <0.10 | <01 | 3.04 | 1.00 | <10 | 208 | 1,871 | 1,174 | 189 | <100 |
| Catalyst 4 | <0.10 | <0.1 | 2.48 | 0.93 | <10 | 88 | 791 | 1,141 | 189 | <100 |
| Catalyst 5 | 0.34 | 0.1 | 5.21 | 0.88 | <10 | <10 | 1,000 | 574 | 215 | <100 |
| Catalyst 6 | 0.24 | 0.1 | 4.59 | 0.84 | <10 | <10 | 1,000 | 375 | 204 | <100 |
| Catalyst 7 | 0.31 | 0.1 | 5.65 | 0.82 | <10 | 290 | 2,400 | 646 | 174 | <100 |
| Catalyst 8 | 0.40 | 0.1 | 7.55 | 0.89 | <10 | 223 | 2,100 | 634 | 163 | <100 |

Example 1

A vacuum gas oil feedstock was hydrocracked in a single reactor hydrocracking unit, using techniques well known in the art. Feedstock blend was characterized by a density of 930.5 kg/L, 2.021 w % sulfur, and 1.280 ppmw nitrogen. The initial boiling point of the feedstock was 321° C. (0 w %); 384° C. (5 wt %); 404° C. (10 w %); 451° C. (30 w %); 487° C. (50 w %); 525° C. (70 w %); 577° C. (90 w %); and 598° C. (95 w %). A zeolite catalyst containing 50% zeolite, and 50% silica/alumina as a binder, containing 8.8 w % NiO, and 11 w % Mo as active metals, was used in the hydrocracking zone. Hydrocracking took place at 125 bars partial pressure, a temperature range of 360, 375, and 390° C., liquid hourly space velocity of 0.32 h$^{-1}$, and hydrogen:oil ratio of 1200:1 liters/liters.

The results indicated that a temperature of 377° C. was required to convert 50 w % of the distillate, with a mid-distillate yield of 44.9 w %.

Example 2

The feedstock described in Example 1 was hydrocracked using the same catalyst base material, but one loaded with 11 w % NiO, and 20 w % MoO$_3$. At these conditions, a temperature of 375° C. was required to convert 50 w/o of the feed stock, with a yield of 48.4 w %. The temperature required dropped by 2.6° C., and yield rose 3.5 w %.

Example 3

A series of simulations were carried out. A fixed, fresh zeolite component (10%), fixed, regenerated spent catalyst (90%), and varying amounts of NiO and MoO$_3$ were used. The regenerated, spent catalyst contained 4 w % NiO and 16 w % MoO$_3$. Additional NiO and MoO$_3$ were spiked to produce the recited concentrations. Table 1, which follows, shows the results in terms of activity gain and middle distillate ("MD") selectively. Doubling metal oxide amounts results in an activity gain of 3° C., and an increase of 6.8 w % middle distillate.

TABLE 2

| NiO, W % | MoO$_3$, W % | Activity Gain, ° C. | MD Selectivity, W % |
|---|---|---|---|
| 5.0 | 18.5 | 0.95 | 2.16 |
| 6.0 | 19.5 | 1.64 | 3.71 |
| 7.0 | 20.5 | 2.32 | 5.25 |
| 8.0 | 21.5 | 3.00 | 6.80 |

The foregoing examples and disclosure describe features of the invention, which include a composition of matter comprising a zeolite based catalyst combined with a binder of regenerated spent catalyst. These catalysts can be used, e.g., for hydrotreating and hydrocracking, wherein processes such as hydrometallization, hydrodesulfurization, hydrogenitrogenation, removal of asphaltenes, removal of carbon residues, etc. are included.

These processes can use a fixed bed, ebullated bed, moving bed, or slurry bed based reactor, where one, or more than one reactor can be used. For example, a two reactor system can include a hydrogen feedstock-liquid phase, and a catalyst solid phase reactor, while a three reactor system can use hydrogen-gas, feedstock-liquid, and catalyst-solid phase reactors. This is in contrast to FCC processes, where riser and/or downer type reactors are used, and no hydrogen is injected into the reaction.

Processes of the invention are carried out at conditions such as those provided herein. The reactions take place at temperatures from 350-450° C., pressure of 10-250 bars, residence times of 450-36,000 seconds, a hydrogen/oil ratio of from 100-150 SLT/LT. These conditions differ from standard FCC processes, which includes temperatures of 450-650° C., pressures of 1-3 bars, residence times of 0.1-30 seconds.

Catalytic metals used in the compositions of the invention can include Mo and/or Ni, and/or Co and/or W. Cr, seen in the prior art as an active catalytic metal for other processes, is excluded from the hydrotreating/hydrocracking catalysts of the invention because it is not an active phase metal.

Other features of the invention will be clear to the skilled artisan and need not be reiterated here.

The terms and expression which have been employed are used as terms of description and not of limitation, and there is no intention in the use of such terms and expression of excluding any equivalents of the features shown and described or portions thereof, it being recognized that various modifications are possible within the scope of the invention.

We claim:

1. A composition of matter comprising:
  (i) a fresh hydrotreating or hydrocracking catalyst, said hydrotreating or hydrocracking catalyst comprises a zeolite, one or more of Mo, Ni, Co, and W, and a binder, wherein said binder comprises regenerated spent catalyst, wherein said regenerated catalyst has not been treated to recover any active metals contained therein.

2. The composition of matter of claim 1, wherein said regenerated spent catalyst is a spent hydrotreating or hydrocracking catalyst.

3. The composition of matter of claim 1, wherein said fresh and regenerated spent catalyst are the same.

4. The composition of matter of claim 1, wherein said fresh and regenerated spent catalyst are different.

5. The composition of matter of claim 1, wherein said regenerated spent catalyst is a powder with a mesh size of 30 or greater.

6. The composition of claim 1, wherein said regenerated spent catalyst further comprises C, S, W, P, Ni, Mo, Co, W, Fe, or As.

7. The composition of claim 1, further comprising an additional fresh binder.

8. The composition of claim 7, wherein said fresh binder comprises USY-zeolite.

9. A method for hydrotreating or hydrocracking a hydrocarbon feedstock, comprising contacting the composition of matter of claim 1 to said hydrocarbon feedstock at a temperature of from 350-400° C., a pressure of 10-250 bars, a residence time of 450-36,000 seconds, a hydrogen/oil ratio of from 100-150 SLT/LT.

10. The method of claim 9, said method comprising a two reactor system.

11. The method of claim 10, wherein said two reactor system comprises a hydrogen feedstock liquid phase and a catalyst solid phase reactor.

12. The method of claim 9, said method comprising a three reactor system.

13. The method of claim 9, wherein said three reactor system comprises hydrogen-gas, feedstock-liquid, and catalyst-solid phase reactors.

14. The method of claim 9, comprising a fixed bed, ebullated bed, moving bed, or slurry bed reactor.

15. The composition of matter of claim 1, wherein said binder comprises USY hierarchical/mesoporous-zeolite substituted with Ti and Zr in its framework T atoms.

* * * * *